Feb. 13, 1934.    W. E. TRUMPLER    1,946,993
BEARING
Filed Dec. 30, 1932
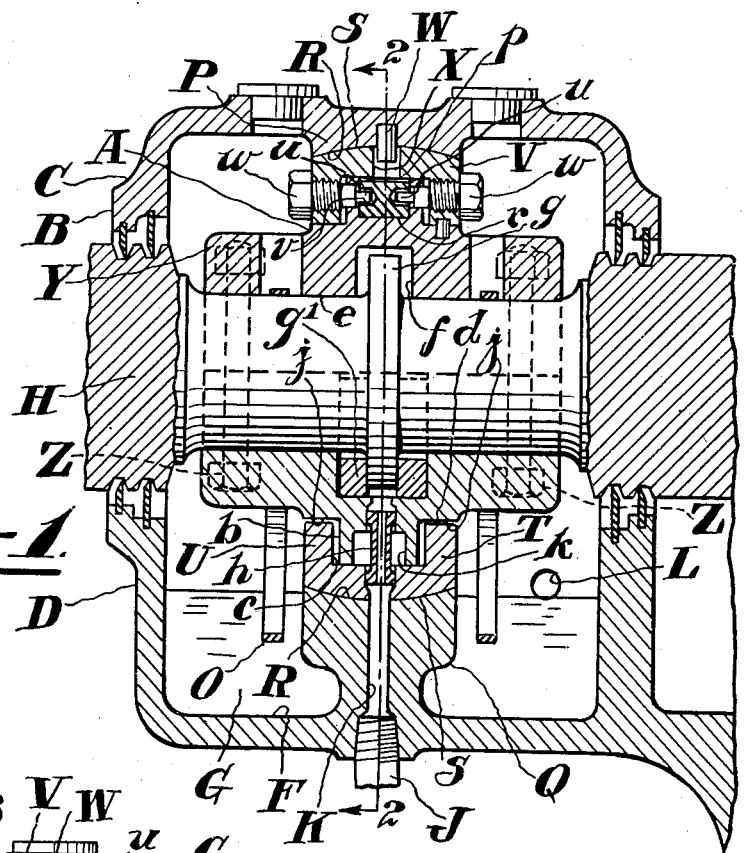
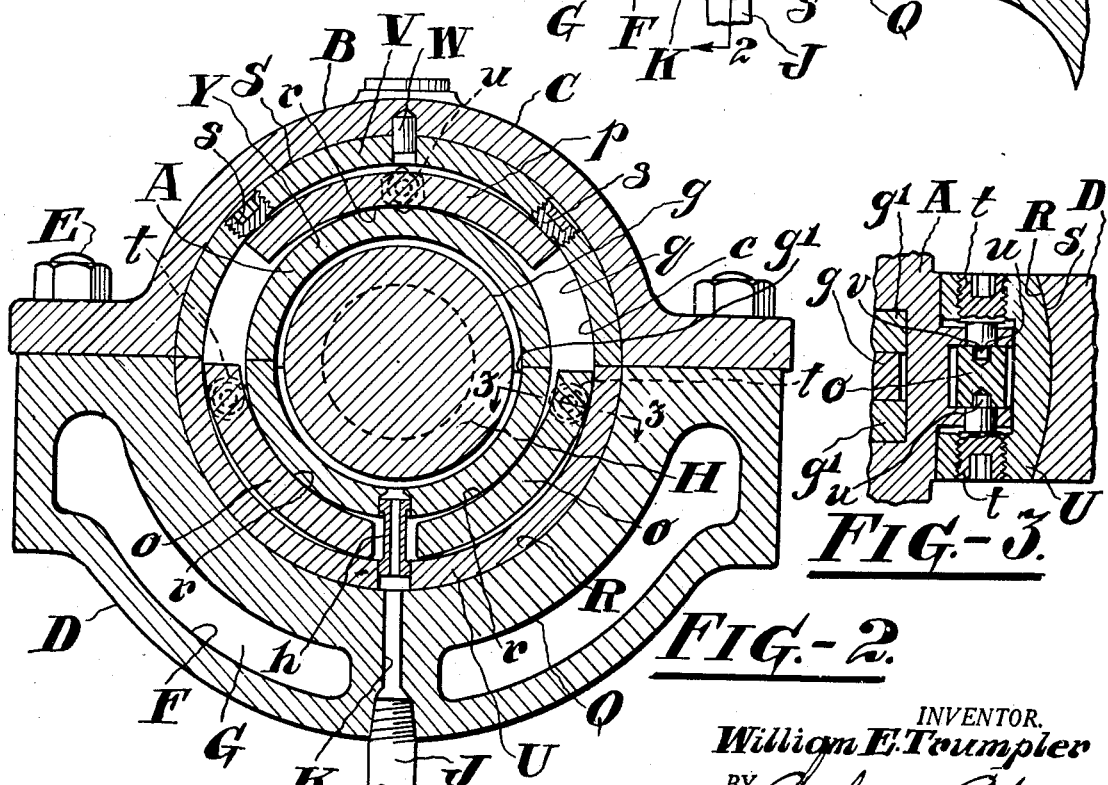
INVENTOR.
William E. Trumpler
BY
HIS ATTORNEY Patented Feb. 13, 1934

1,946,993

UNITED STATES PATENT OFFICE 1,946,993

BEARING

William E. Trumpler, Easton, Pa., assignor to Ingersoll-Rand Company, Jersey City, N. J., a corporation of New Jersey Application December 30, 1932
Serial No. 649,511

7 Claims. (Cl. 308—26)

This invention relates to bearings, and more particularly to flexible bearings for shafts of pumps, blowers, etc.

One object of the invention is to avoid subjecting the bearing to excessive pressures and the deleterious effects of vibration resulting from operating a shaft at high speeds.

Another object is to enable the bearing to adjust itself to a position of complete concentricity with the shaft and thus compensate for errors in the matter of alignment of the shaft.

Other objects will be in part obvious and in part pointed out hereinafter.

In the drawing accompanying this specification and in which similar reference characters refer to similar parts, Figure 1 is a longitudinal sectional elevation of a bearing constructed in accordance with the practice of the invention, Figure 2 is a transverse view taken through Figure 1 on the line 2—2 looking in the direction indicated by the arrows, and Figure 3 is a transverse section taken through Figure 2 on the line 3—3.

Referring more particularly to the drawing, the bearing constructed in accordance with the practice of the invention, and designated in general by A, is shown disposed within a housing B consisting of upper and lower sections C and D, respectively.

The sections C and D may be secured together in any convenient manner as by bolts E and the interior thereof constitutes a reservoir F for oil G whereby the various surfaces of the bearing A and a shaft H which it supports are lubricated. The oil is supplied to the bearing from a suitable source of oil under pressure (not shown) by a conduit J which opens into a passage K in the bottom housing section D, and the excess oil which passes through the bearing flows into the reservoir F from where it may pass through an outlet opening L to the pumping device (not shown).

The outlet opening L is arranged at a suitable point above the bottom of the reservoir F to assure a certain volume of oil within the reservoir, thus assuring immersion of portions of endless flexible members O which lie upon the shaft H and are rotated thereby to dip and convey oil from the reservoir to the surface of the shaft. The members O serve the usual and well known function of providing an immediate supply of lubricant to the shaft at the beginning of operation and before the machine, of which the shaft H forms a part, and the oil pumping device have attained a speed sufficient to assure an adequate supply of oil under pressure to the bearing.

On the inner surfaces of the casing sections C and D are ribs P and Q, respectively, which join in the horizontal plane of the bearing and are provided with partly spherical surfaces R which serve as seats for correspondingly shaped surfaces S of a shroud ring T. The ring T consists of a pair of semi-circular sections U and V which are held against unlimited movement with respect to the housing B by a pin W seated, in the present instance, in the casing section C and extending into an aperture X in the shroud ring.

The aperture X is preferably of somewhat larger diameter than the pin W so that the shroud ring may shift upon the surfaces R and thereby adjust itself in accordance with such slight variations in the position of the shaft H as may occur either during operation or the machining and assembling of the parts.

Disposed within the shroud ring T and about the shaft H is a bearing shell Y comprising a pair of half sections secured together by bolts Z. On the periphery of the shell Y is an annular rib $b$ which extends into an annular groove $c$ in the inner surface $d$ of the shroud ring T. The rib $b$ is preferably of somewhat less width than the width of the groove $c$ to permit a limited degree of endwise movement of the shell Y within the shroud ring T.

In the inner surface $e$ of the shell Y is an annular chamber $f$ for the accommodation of a flange $g$, carried by the shaft, and thrust blocks $g'$ against which the flange $g$ may seat. The chamber $f$ constitutes a chamber for oil which is supplied thereto from the passage K by a tube $h$ seated with one end in the shroud ring T and with its other end in the shell Y. Owing to this arrangement the chamber $f$ will be constantly maintained full of oil to supply the cooperating surfaces of the shaft H and the bearing elements with lubricant.

The bore within the shroud ring T and of which the surface $d$ forms the bounding surface is preferably sufficiently larger than the adjacent surface or surfaces $j$ of the shell to permit the entrance of oil therebetween for the purpose of cushioning the movement of the shell Y in a lateral direction with respect to the shroud ring T.

To the end that the bearing shell Y may be resiliently supported the rib $b$ is provided in its periphery with an annular groove $k$ for the accommodation of spring devices consisting, in the present instance, of flexible beams $o$ and $p$. The beams o and p are in the form of segments curved on a larger radius than the groove k so that, in their assembled positions, they will seat only with their extremities against the bottom q of the groove c of the shroud ring. Thus arranged the intermediate portions of the inner surface r of the beams o and p will seat against the shell Y and, as where three beams are employed, support the shell at three points. As a preferred arrangement the beams o are of less length than a quarter segment in order to permit the tube h to be disposed between adjacent ends of the beams. The uppermost ends of the beams o preferably lie adjacent or immediately below the horizontal plane of the bearing.

The beam p, which lies directly above the shell Y and contacts with its inner surface r with the shell at a point in the vertical plane of the shell, differs from the beams o only in the respect that it is of somewhat greater length. Its extremities may also seat against the bottom q of the groove c. As a preferred form of construction, however, the ends of the beam p seat against set screws s threaded into the shroud ring T for the purpose of flexing the beam p, thereby depressing the shell Y and flexing the beams o upon which the shell Y lies. In this way the shell Y may be adjusted into true coaxial relationship with respect to the shaft H and such other bearings whereby the shaft is supported.

To the end that the shell Y may be conveniently shifted longitudinally of the shroud ring T to assure the correct position of the thrust blocks g' with respect to the flange g the shroud ring T is provided in its ends with a series of set screws t which are threaded in the ends of the shroud ring and seat against the beams. Thus, if it be desired to shift the shell longitudinally of the shroud ring the opposed set screws t may be manipulated to effect such adjustment.

In addition to their function of effecting adjustment of the shell Y the set screws t also serve as anchors for maintaining the beams o in substantially the correct position with respect to the shell Y. The screws t are accordingly provided, on their inner ends, with reduced stems u which extend into apertures v in the beams o. The beam p is likewise held against endwise movement by screws w threaded into the shroud ring T and having stems u which project into apertures v in the beam p.

In practice the invention has been found to be highly advantageous as a means of avoiding the subjection of the bearing to excessive pressures or the undesirable effects of vibration resulting from operating a shaft at high speeds. As will be observed, the bearing whereby the shaft is supported is capable of adjusting itself with respect to the shaft. All of the cooperating movable and stationary surfaces of the bearing and shaft are adequately lubricated and, as will be apparent, should the shaft be operated under conditions inducing severe vibration the beams whereby the shell Y and the shaft are supported will permit the shell to shift slightly in a lateral direction and, by so doing, avoid the danger of injuring either the shaft or the shell.

I claim:

1. A bearing comprising a shell, a housing for the shell, a plurality of flexible devices for holding the shell suspended within the housing, adjustable means for flexing the devices, and means carried by the housing and being adjustable therein for shifting the flexible devices longitudinally of the housing.

2. A bearing comprising a shell, a housing for the shell, a plurality of flexible beams within the housing for holding the shell suspended within the housing, screws in the housing for flexing the beams, and screws in the housing acting against the beams to shift said beams longitudinally of the housing.

3. A bearing comprising a shell, a housing for the shell, a plurality of flexible beams seating with their extremities against the housing and with intermediate portions against the shell to maintain the shell suspended within the housing, screws in the housing acting against the extremities of one beam for effecting flexion of the beams, and screws in the housing acting against the beams for actuating the beams and the shell longitudinally of the housing.

4. A bearing comprising a shell, a housing for the shell, there being cooperating means on the shell and the housing for limiting longitudinal movement of the shell with respect to the housing, a plurality of flexible beams seating at spaced points against the shell and the housing for supporting the shell, means for flexing the beams to shift the shell transversely of the housing, and adjustable means carried by the housing and acting against the shell for shifting the shell longitudinally of the housing.

5. A bearing comprising a shell, a housing for the shell, a plurality of flexible devices for holding the shell resiliently suspended within the housing, and means carried by the housing and being adjustable therein for shifting the shell longitudinally of the housing.

6. A bearing comprising a shell, a housing for the shell, a plurality of flexible devices for holding the shell resiliently suspended within the housing, and means for shifting the shell longitudinally of the housing and being in interlocking engagement with the flexible devices to maintain said devices in the correct assembled position.

7. A bearing comprising a shell, a housing for the shell, a plurality of flexible beams within the housing for holding the shell suspended within the housing and having apertures therein, adjustable means for effecting flexion of the devices, screws threaded into the housing and acting against the beams for adjusting the shell longitudinally of the housing, and stems on the screws extending into the apertures for holding the beams against endwise movement.

WILLIAM E. TRUMPLER.